US008505817B2

(12) United States Patent
Iizaka (10) Patent No.: US 8,505,817 B2
(45) Date of Patent: Aug. 13, 2013

(54) CODE READING APPARATUS AND CODE READING METHOD

(75) Inventor: Hitoshi Iizaka, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/276,387

(22) Filed: Oct. 19, 2011

(65) Prior Publication Data

US 2012/0104087 A1    May 3, 2012

(30) Foreign Application Priority Data

Nov. 1, 2010   (JP) ................................ 2010-245369
Aug. 17, 2011  (JP) ................................ 2011-178545

(51) Int. Cl.
*G06K 15/00* (2006.01)

(52) U.S. Cl.
USPC ..................................................... 235/383

(58) Field of Classification Search
USPC ............................. 235/375, 383, 385, 462.01
See application file for complete search history.

(56) References Cited

U.S. PATENT DOCUMENTS

| 5,426,284 A | * | 6/1995 | Doyle ............................. 705/28 |
| 6,158,660 A | * | 12/2000 | Blanford et al. ......... 235/462.11 |
| 7,191,951 B2 | * | 3/2007 | Hanyu et al. .................. 235/486 |
| 8,109,439 B2 | * | 2/2012 | Tsuchiya et al. .............. 235/385 |
| 2006/0028014 A1 | * | 2/2006 | McQueeny et al. ........... 283/101 |
| 2010/0327058 A1 | * | 12/2010 | Schuller ........................ 235/383 |
| 2011/0180596 A1 | * | 7/2011 | Iizaka et al. .................. 235/375 |
| 2011/0315764 A1 | * | 12/2011 | Suzuki .......................... 235/383 |

FOREIGN PATENT DOCUMENTS

| JP | 3047598 | | 1/1998 |
| JP | 11174958 A | * | 7/1999 |
| JP | 2007-272585 | | 10/2007 |
| JP | 2008-033640 | | 2/2008 |

OTHER PUBLICATIONS

English Translation of Office Action of Notice of Rejection for Application No. 2011-178545 Dated Mar. 12, 2013, 7 pgs.

* cited by examiner

*Primary Examiner* — Seung Lee
(74) *Attorney, Agent, or Firm* — Turocy & Watson, LLP (57) ABSTRACT

According to one embodiment, a code reading apparatus includes an image capturing section, a first detecting section, a second detecting section, and an informing section. The image capturing section captures an image picked up by an image pickup section. The first detecting section detects a first symbol including commodity information of a commodity from the image captured by the image capturing section. The second detecting section detects a second symbol different from the shape of an element included in the first symbol in the image captured by the image capturing section. The informing section informs, if the second detecting section detects the second symbol, that a benefit indication indicating a benefit granted with respect to the commodity information is affixed to the commodity.

16 Claims, 9 Drawing Sheets

CODE READING APPARATUS AND CODE READING METHOD

CROSS-REFERENCE TO RELATED APPLICATION

This application is based upon and claims the benefit of priority from the prior Japanese Patent Applications No. 2010-245369 field on Nov. 1, 2010 and No. 2011-178545 filed on Aug. 17, 2011, the entire contents of all of which are incorporated herein by reference.

FIELD

Embodiments described herein relate generally to a code reading apparatus and a code reading method.

BACKGROUND

In a store such as a supermarket, to reduce wastage of perishables, when the closing time approaches, discount labels on which price-cut amount, discount rates, and the like are shown are affixed to commodities to perform discounted sales.

In the past, a code reading apparatus is disclosed that picks up an image of a discount label, which is affixed near a barcode, together with the barcode using an image pickup element such as a CCD (Charge Coupled Device) image sensor and reads a commodity code and discount information indicated by the discount label from the picked-up image. The code reading apparatus outputs the read commodity code and the discount information to a POS (Point Of Sales) terminal. The POS terminal can perform discounted sales of a commodity according to the commodity code and the discount information received from the code reading apparatus.

However, in the related art, for example, if the discount label is not affixed in an image pickup area where an image of the discount label can be picked up together with the barcode in one shot or if the discount label cannot be recognized as an image, the discount label could not be read. Therefore, it is difficult to surely perform a discount.

DETAILED DESCRIPTION

In general, according to one embodiment, a code reading apparatus includes an image capturing section, a first detecting section, a second detecting section, and an informing section. The image capturing section captures an image picked up by an image pickup section. The first detecting section detects a first symbol including commodity information of a commodity from the image captured by the image capturing section. The second detecting section detects a second symbol different from the shape of an element included in the first symbol in the image captured by the image capturing section. The informing section informs, if the second detecting section detects the second symbol, that a benefit indication indicating a benefit granted with respect to the commodity information is affixed to the commodity.

First Embodiment

Figure 1:
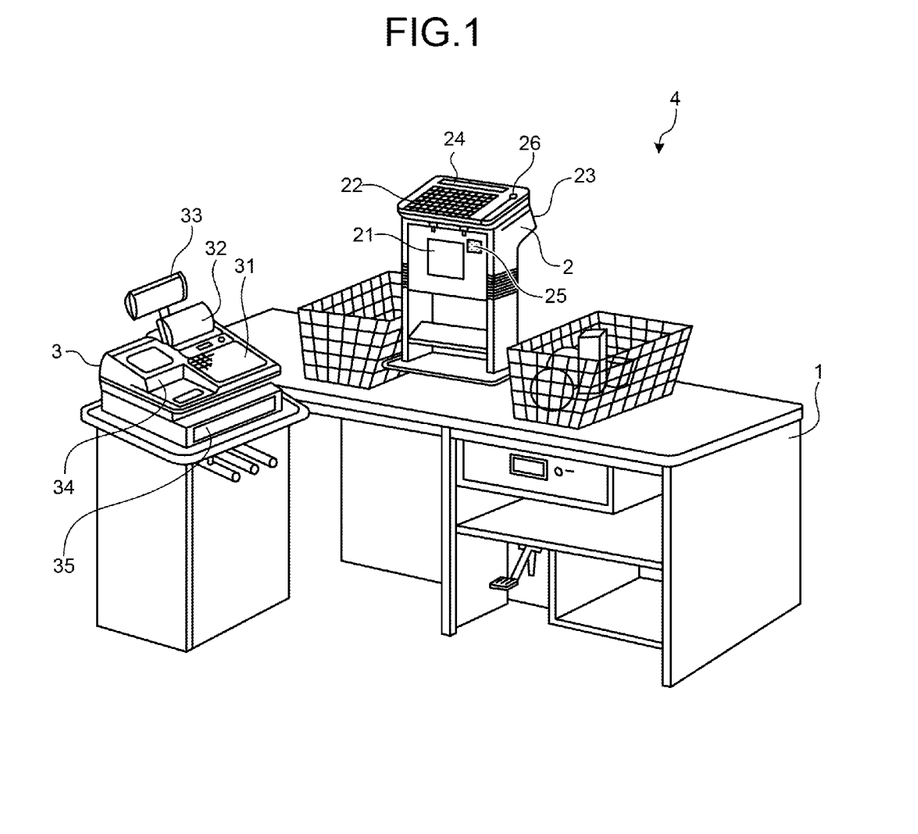
FIG. 1 is a schematic external perspective view of the configuration of a checkout lane system including a code reading apparatus according to a first embodiment.

FIG. 1 is a schematic external perspective view of the configuration of a checkout lane system 4 including a code reading apparatus 2 according to a first embodiment. As shown in FIG. 1, the checkout lane system 4 includes a sucker table 1 for placing a shopping basket including commodities, the code reading apparatus 2 vertically provided substantially in the center of the sucker table 1, and a POS terminal 3 connected to the code reading apparatus 2 to be capable of communicating with each other through a not-shown transmission line.

The POS terminal 3 performs sales registration for commodities to be purchased by a customer. As shown in FIG. 1, the POS terminal 3 includes a keyboard 31, an operator display 32, a customer display 33, a printer 34 configured to perform sheet printing, and a drawer 35 for storing cash and the like. A closing key and the like necessary for settlement of commodity price are disposed on the keyboard 31. The POS terminal 3 includes a configuration and a function same as those of a POS terminal commonly used in a checkout lane system of this type.

The code reading apparatus 2 is an apparatus for reading a barcode affixed to a commodity and outputting commodity information included in the barcode to the POS terminal 3. As shown in FIG. 1, the code reading apparatus 2 mainly includes a reading window 21, a keyboard 22, a customer display 23, a store clerk display 24, a buzzer 25, and an LED 26.

The keyboard 22 receives an input by various keys when registration of a commodity that cannot be registered by a barcode is performed. The customer display 23 displays a name, price, and the like of a registered commodity to a customer or a store clerk. The store clerk display 24 displays the name and price of the registered commodity, an error message, and the like to a store clerk assigned as an operator.

A camera 20 (see FIG. 2) is incorporated on the inside of the code reading apparatus 2 on a side where a reading window 21 is provided. For example, the camera 20 may be an image pickup apparatus including a CCD (Charge Coupled Device) or may be an image pickup apparatus including another image pickup element such as a CMOS (Complementary Metal Oxide Semiconductor). The camera 20 picks up an image of a commodity held over an image pickup area opposed to the reading window 21.

Figure 2:
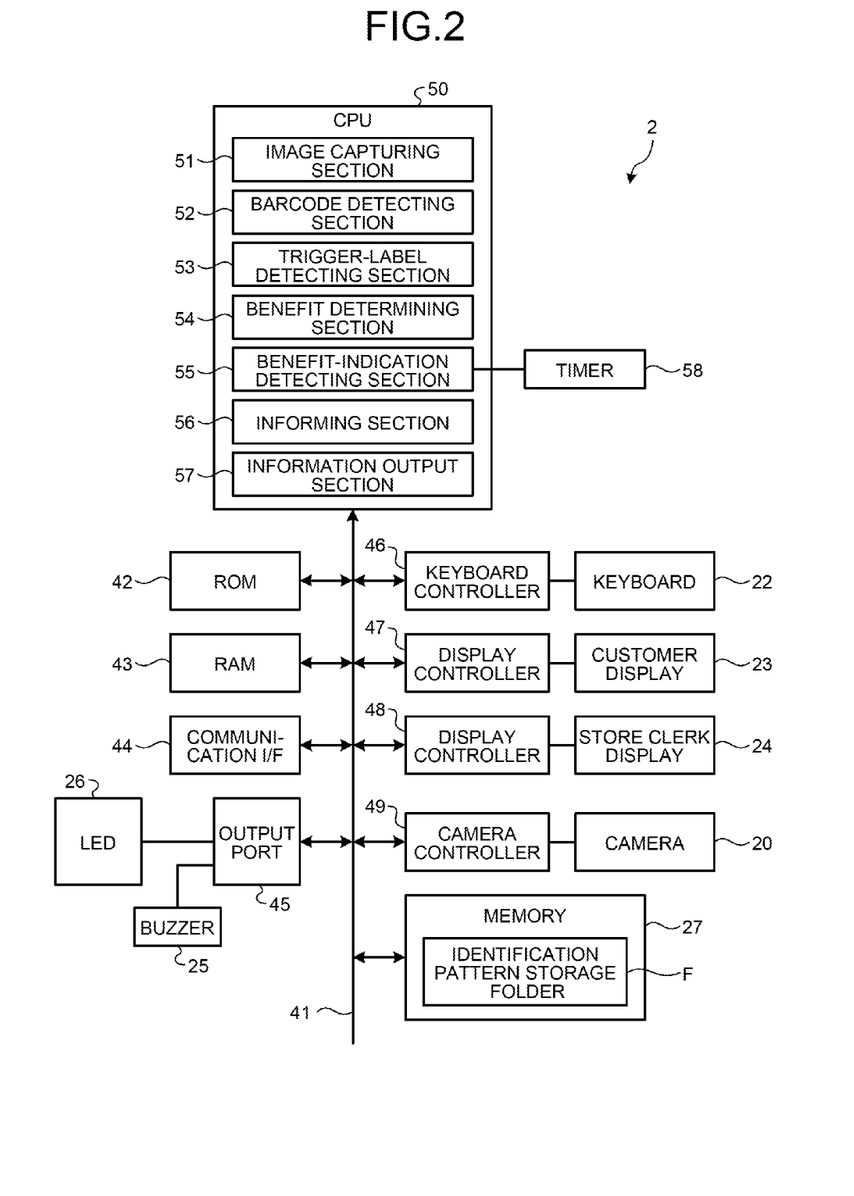
FIG. 2 is a block diagram of the configuration of the code reading apparatus.

FIG. 2 is a block diagram of the configuration of the code reading apparatus 2. The code reading apparatus 2 mainly includes a CPU 50, a ROM 42, a RAM 43, a communication I/F 44, an output port 45, a keyboard controller 46, display controllers 47 and 48, a camera controller 49, and a memory 27. These devices are connected by a bus line 41 such as an address bus or a data bus.

The CPU 50 functions as a control section configured to control an overall operation of the code reading apparatus 2. The ROM 42 has stored therein a computer program according to this embodiment and other computer programs for controlling the operation of the CPU 50. The RAM 43 functions as a work area when the CPU 50 expands the various computer programs stored in the ROM 42. The RAM 43 stores various data such as image data picked up by the camera 20.

The communication I/F 44 controls data communication with the POS terminal 3 (see FIG. 1) connected to the code reading apparatus 2 via a bus. The output port 45 outputs driving signals to the buzzer 25 and the LED 26. The keyboard controller 46 captures a key signal from the keyboard 22. The display controller 47 controls data display on the customer display 23. The display controller 48 controls data display on the store clerk display 24. The camera controller 49 controls an image pickup operation of the camera 20.

The camera 20 picks up images of, for example, a code symbol (a first symbol) such as a barcode or a two-dimensional code affixed to a commodity and a label (a benefit indication) on which a benefit such as a discount or point addition is shown. Image pickup for the code symbol or the benefit indication by the camera 20 is explained.

Figure 3:
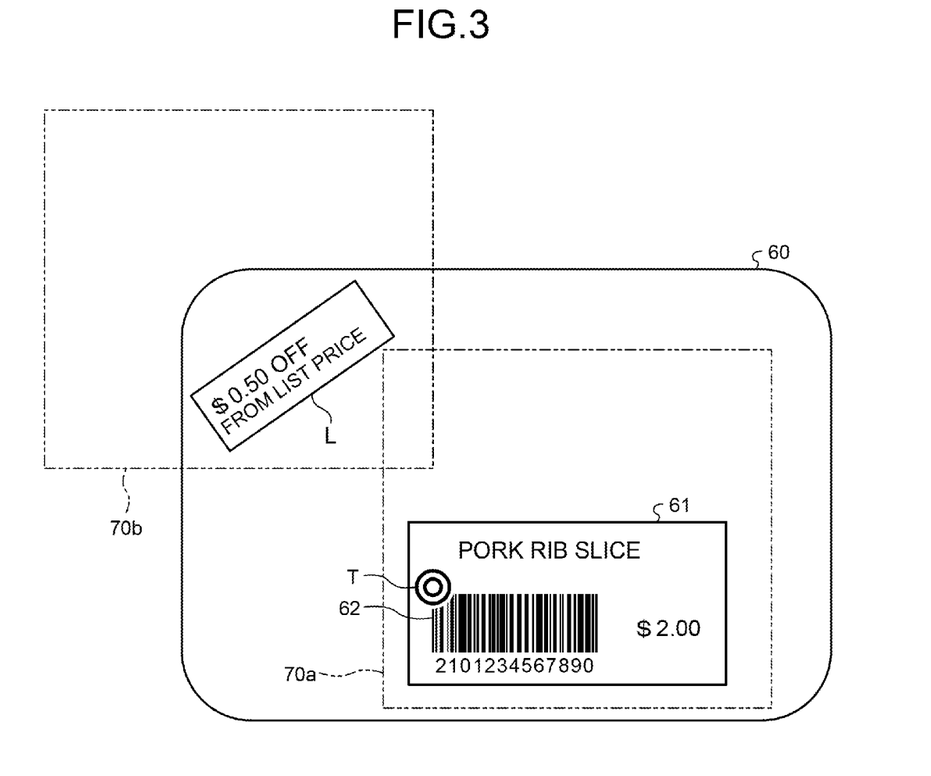
FIG. 3 is a diagram of an example of a relation between a commodity and an image pickup area of a camera.

FIG. 3 is a diagram of an example of a relation between a commodity 60 and the image pickup area of the camera 20. In the figure, areas surrounded by alternate long and two short dashes lines are image pickup areas 70a and 70b, which are areas that the camera 20 can perform image pickup in one frame. A discount label L, which is an example of the benefit indication, is affixed to the commodity 60 shown in FIG. 3 in addition to a barcode label 61.

On the barcode label 61, a commodity name "pork rib slice", a commodity price "$2.00", a barcode 62, and the like are shown. Information such as a commodity code is incorporated in the barcode 62 as commodity information necessary for registering sales data of the commodity 60 in the POS terminal 3. The commodity code incorporated in the barcode 62 is shown as a number "2101234567890" under the barcode 62. Character information "$0.50 off list price" indicating a discount amount concerning the commodity 60 is shown on the discount label L.

The benefit indication only has to be affixed to the commodity 60 and show benefit information affixed to a benefit granted during sales registration for the commodity 60. In other words, the benefit indication is indication for showing, as characters or a symbol, a benefit granted with respect to commodity information of the commodity 60 included in the barcode 62. Other examples of the benefit indication include a discount label showing a discount rate of the commodity 60 and a point addition label showing the number of points granted to a customer who purchases the commodity 60 in addition to a usual number of granted points.

Further, as shown in FIG. 3, a trigger label T (a second symbol) indicating that a benefit indication is affixed to the commodity 60 is affixed to the commodity 60. The trigger label T includes a figure different from the shape of an element included in the code symbol. Since the barcode 62 includes plural bars, the trigger label T includes, for example, a circle or a circumference or a triangle, which is a shape different from the bars of the barcode 62, or a square having an aspect ratio different from that of the bars of the barcode 62.

A preferred embodiment of the trigger label T desirably includes a double or more concentric shape. A more preferred embodiment of the trigger label T desirably includes double concentric circumferences as shown in FIG. 3. The respective circumferences are desirably formed by thick lines having predetermined thickness.

The trigger label T may be affixed not to overlap the barcode 62 or may be affixed to overlap a part of the barcode 62 as shown in FIG. 3. However, in both the cases, the trigger label T is affixed to allow the barcode 62 to be decoded.

As shown in FIG. 3, if the barcode 62 and the discount label L are affixed apart from each other on the commodity 60, the barcode 62 and the discount label L do not fit in the same image pickup area. In such a case, the operator changes the position of the commodity 60 held over the reading window 21 and picks up images of the commodity 60 plural times in plural frames: the image pickup area 70a including the barcode 62 and the image pickup area 70b including the discount label L.

Referring back to FIG. 2, the memory 27 is a nonvolatile memory and has stored therein an identification pattern storage folder F. In the identification pattern storage folder F, information concerning characteristics of the trigger label T such as the shape included in the trigger label T is stored.

A functional configuration of the code reading apparatus 2 realized by the CPU 50 executing a computer program is explained. The CPU 50 operates according to a computer program stored in the ROM 42 and expanded on the RAM 43 to function as, as shown in FIG. 2, an image capturing section 51, a barcode detecting section 52 (a first detecting section), a trigger-label detecting section 53 (a second detecting section), a benefit determining section 54, a benefit-indication detecting section 55, an informing section 56, and an information output section 57.

The image capturing section 51 outputs an image pickup ON signal to the camera controller 49 to cause the camera 20 to start an image pickup operation. If instructed by the benefit-indication detecting section 55, the image capturing section 51 captures an image in the image pickup area 70a or 70b picked up by the camera 20 and stores the image in an image work area of the RAM 43.

The barcode detecting section 52 detects a code symbol from the image captured by the image capturing section 51. Specifically, the barcode detecting section 52 performs, for example, detection of a barcode from the captured image by a pattern matching technique and detection of a two-dimensional code from a predetermined finder pattern. The barcode detecting section 52 converts the detected code symbol into code information according to a predetermined decoding method and reads code information corresponding to the code symbol. For example, in the example shown in FIG. 3, the barcode detecting section 52 detects the barcode 62 and reads the commodity code "2101234567890" corresponding to the barcode 62.

Figure 4:
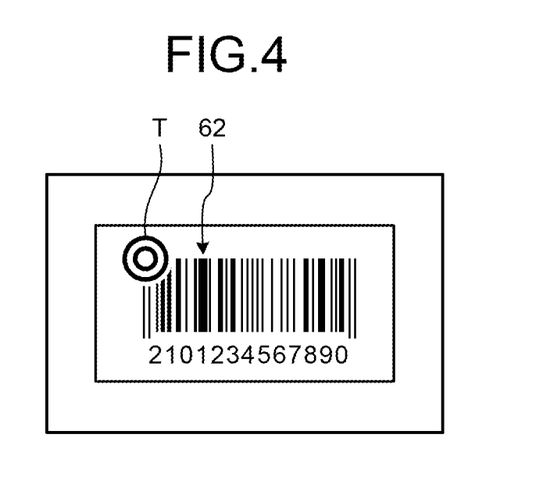
FIG. 4 is a diagram of an image of an area including a barcode.

The trigger-label detecting section 53 detects the trigger label T from an image captured by the image capturing section 51. More specifically, the trigger-label detecting section 53 extracts an area including the barcode 62 as shown in FIG.

4. The trigger-label detecting section 53 extracts a contour (an edge) of an image in the extracted area, for example, as shown in FIG. 5.

Figure 5:
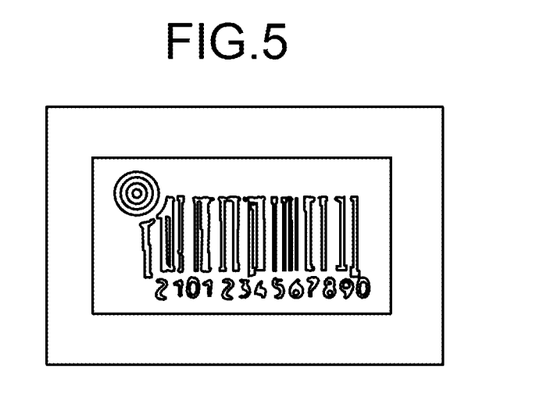
FIG. 5 is a diagram of an image of a trigger label subjected to edge extraction.

As shown in FIG. 3 or 4, if double concentric circumferences are included in the trigger label T, an extracted edge shape is quadruple circumferences as shown in FIG. 5. In the identification pattern storage folder F, a quadruple circle is associated as an identification pattern corresponding to this double-circle trigger label T. If the extracted edge shape (the quadruple circle) coincides with the identification pattern (the quadruple circle) stored in the identification pattern storage folder F, the trigger-label detecting section 53 detects the image (the double circle) corresponding to the edge shape (the quadruple circle) as the trigger label T.

As a preferred embodiment, the trigger label T desirably has a shape that is easily identified such as the circumference explained above. Consequently, it is possible to reduce time required for the trigger-label detecting section 53 to identify the trigger label T. The trigger label T desirably has a shape that is easily identified as the trigger label T even if an image of the commodity 60 is picked up in a state in which the commodity 60 tilts with respect to the camera 20. If a circle is included in the trigger label T, a circular shape is easily identified even in a state in which the commodity 60 tilts with respect to the camera 20. Therefore, it is desirable to use a circular shape for the trigger label T.

As a more preferred embodiment, it is desirable to include double concentric circumferences shown in FIG. 4 in the trigger label T in order to improve an identification success rate of the trigger T.

If a circumference is single in the trigger label T, it is likely that the circumference is confused with a number 0 (zero). If an inner circle is painted out and is not a circumference in the trigger label T, an edge shape of this figure is triple. On the other hand, a finder pattern (see FIG. 11) of a two-dimensional code used in the past is a triple square shape when subjected to edge extraction. Therefore, if the triple edge shape is used as an identification pattern, it is likely that apart of the finder pattern is misrecognized as the trigger label T.

On the other hand, if the double concentric circumferences are included in the trigger pattern T as explained above, since the edge shape is quadruple, it is possible to improve the identification success rate of the trigger label T.

If the trigger-label detecting section 53 detects the trigger label T, the benefit determining section 54 determines that a benefit indication is affixed to the commodity 60.

The benefit-indication detecting section 55 detects an image of the benefit indication from the image stored in the image work area of the RAM 43 by the image capturing section 51. The benefit-indication detecting section 55 continues to detect a benefit indication while a timer 58 does not time out, i.e., while a predetermined time set in advance does not pass.

More specifically, the benefit-indication detecting section 55 instructs the image capturing section 51 to perform image capturing while the timer 58 does not time out and the benefit-indication detecting section 55 does not detect a benefit indication. The image capturing section 51 captures anew an image in an image pickup area picked up by the camera 20. The benefit-indication detecting section 55 applies processing for detecting a benefit indication to the image captured anew.

If the trigger-label detecting section 53 detects the trigger label T, the benefit-indication detecting section 55 sets a time for detecting a benefit indication longer than a time for detecting a benefit indication when the trigger-label detecting section 53 does not detect the trigger label T.

If the benefit determining section 54 determines that a benefit indication is affixed to the commodity 60, the benefit-indication detecting section 55 extends a measuring time of the timer 58 and extends the time for detecting a benefit indication.

If the benefit-indication detecting section 55 detects an image of the benefit indication, the benefit-indication detecting section 55 reads benefit information corresponding to the benefit indication from the detected image of the benefit indication.

More specifically, the benefit-indication detecting section 55 detects, using information indicating characteristics (a frame line, a shape, etc.) of a label on which a benefit indication is performed, which is set in the ROM 42 or the like in advance, the label according to an image recognition technique. The benefit-indication detecting section 55 applies character recognition processing of an OCR (Optical Character Reader) or the like and pattern matching by object recognition to the detected label to read benefit information such as a discount amount, a discount rate, or a granted point shown on the label. For example, in the example shown in FIG. 3, the benefit-indication detecting section 55 detects the discount label L. Subsequently, the benefit-indication detecting section 55 recognizes characters such as "$0.50" and "off" written on the discount label L and reads benefit information indicating that a price-cut of $0.50 is performed.

According to the operation explained above, the operator can pick up images of the commodity 60 plural time with the camera 20 during a predetermined time in which the timer 58 does not time out. Therefore, even if a benefit indication is not included in the image pickup area 70a including the barcode label 61 as shown in FIG. 3, the operator can perform image pickup again in the image pickup area 70b including the benefit indication and surely read both the code information and the benefit information.

The benefit-indication detecting section 55 is not limited to the identification processing for character information and may identify the color, size, shape, and the like of a label, a figure, or the like and read benefit information associated with the characteristics.

If the trigger-label detecting section 53 detects the trigger label T, the informing section 56 informs that a benefit indication is affixed to the commodity 60. Specifically, if the benefit determining section 54 determines that a benefit indication is affixed to the commodity 60, the informing section 56 informs the operator that the benefit indication is affixed to the commodity 60 or informs the operator of an instruction to read the benefit indication.

Figure 6:
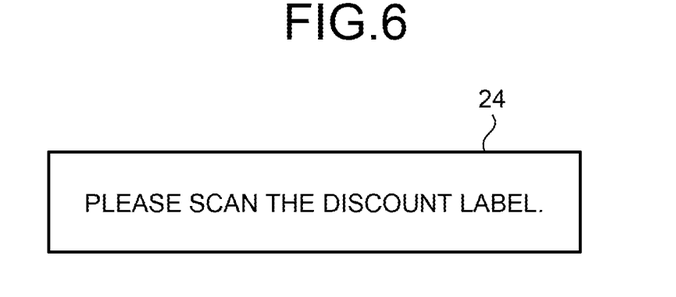
FIG. 6 is a diagram of an example of a message displayed on a store clerk display.

For example, if it is determined that a benefit indication is affixed to the commodity 60, the informing section 56 sounds the buzzer 25 and controls the display controller 48 to display a message such as "Please scan the discount label." on the store clerk display 24 as shown in FIG. 6. Further, the informing section 56 may turn on and off the LED 26.

If the benefit determining section 54 determines that a benefit indication is affixed and the benefit-indication detecting section 55 does not detect a benefit indication within the predetermined time, the informing section 56 informs the operator that the benefit indication is affixed to the commodity 60 or informs the operator of an instruction to read the benefit indication affixed to the commodity 60.

Figure 7A:
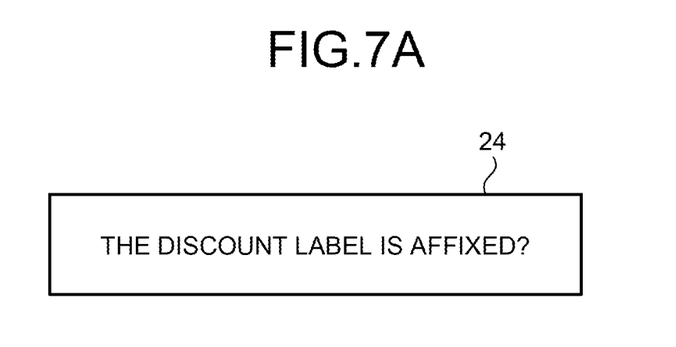
FIG. 7A is a diagram of an example of an error message displayed on the store clerk display.
Figure 7B:
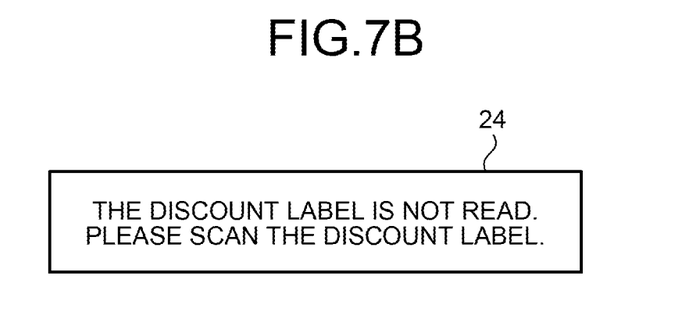
FIG. 7B is a diagram of another example of the error message displayed on the store clerk display.

More specifically, if it is determined that a benefit indication is affixed to the commodity 60 but the benefit indication is not detected and the timer 58 times out, the informing section 56 sounds the buzzer 25 and causes the store clerk display 24 to display an error message such as "The discount label is affixed?" (see FIG. 7A) or "The discount label is not read. Please scan the discount label." (see FIG. 7B).

The information output section 57 outputs the code information read by the barcode detecting section 52 to the POS terminal 3 via the communication I/F 44. If the benefit-indication detecting section 55 reads the benefit information, the information output section 57 outputs the read benefit information to the POS terminal 3 together with the code information.

In some cases, since the discount label L is not affixed depending on a commodity, only the reading of code information is performed by the barcode detecting section 52. Therefore, the information output section 57 outputs at least one of the code information read by the barcode detecting section 52 and the benefit information read by the benefit-indication detecting section 55 to the POS terminal 3.

Even if benefit information is not detected and the timer 58 times out, if an enter key or the like of the keyboard 22 is pressed, the information output section 57 outputs only the code information read by the barcode detecting section 52 to the POS terminal 3.

Specifically, a message such as "The discount label is affixed?" (see FIG. 7A) is displayed on the store clerk display 24 as explained above. The store clerk checks the commodity 60 to find whether a benefit indication is affixed. If it is found that a benefit indication is not affixed to the commodity 60, the store clerk presses, for example, the enter key and outputs only the code information read earlier to the POS terminal 3. The POS terminal 3 performs sales registration for the commodity 60 according to only the code information.

If, although the commodity 60 is a commodity that should originally be discounted, a benefit indication is not affixed to the commodity 60 because the benefit indication peels, benefit information such as a discount amount or a discount rate may be input from the keyboard 22.

The POS terminal 3 receives the code information output by the information output section 57 of the code reading apparatus 2 and performs sales registration for the commodity 60 using the received code information. If the POS terminal 3 receives the benefit information together with the code information, the POS terminal 3 grants a benefit corresponding to the benefit information for the purchase of the commodity 60 and performs sales registration for the commodity 60.

Figure 8:
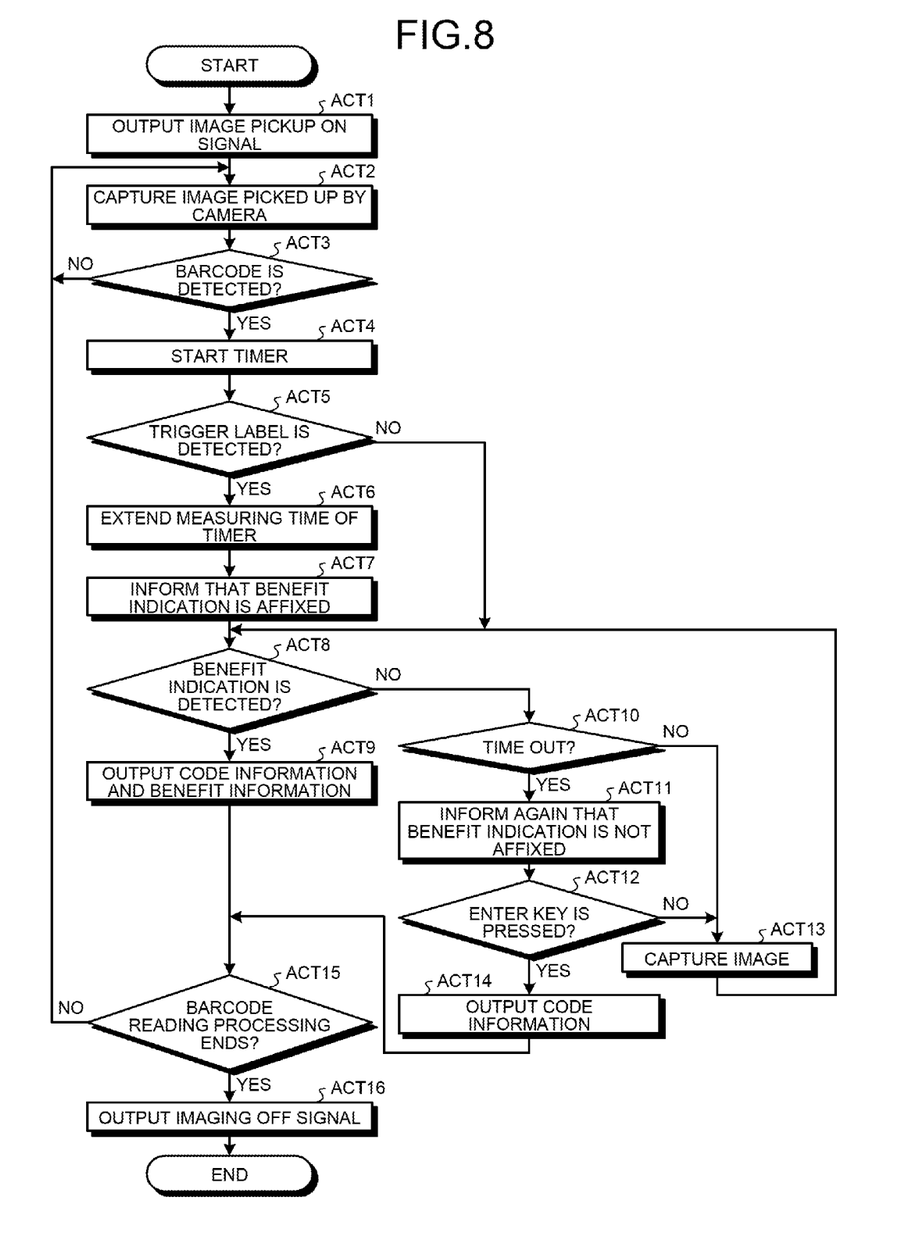
FIG. 8 is a flowchart for explaining a procedure of information reading processing executed by the code reading apparatus.

A procedure of information reading processing executed by the code reading apparatus 2 is explained with reference to FIG. 8. FIG. 8 is a flowchart for explaining the procedure of the information reading processing executed by the code reading apparatus 2.

If the image capturing section 51 of the code reading apparatus 2 receives an instruction to start scanning from the POS terminal 3, the image capturing section 51 outputs an image pickup ON signal to the camera controller 49 and starts image pickup by the camera 20 (ACT 1). The image capturing section 51 captures image data of an image picked up by the camera 20 into the image work area of the RAM 43 (ACT 2).

The barcode detecting section 52 determines whether an image of the barcode 62 is detected in the captured image (ACT 3). If an image of the barcode 62 is not detected (No in ACT 3), the image capturing section 51 continues the image pickup by the camera 20 (ACT 2). If an image of the barcode 62 is detected (Yes in ACT 3), the barcode detecting section 52 reads code information corresponding to the detected barcode 62. The code reading apparatus 2 starts the timer 58 and starts to measure time for detecting benefit indication (ACT 4).

Subsequently, the code reading apparatus 2 determines whether the trigger-label detecting section 53 detects the trigger label T in the image (ACT 5). If the trigger label T is detected (Yes in ACT 5), the benefit determining section 54 determines that a benefit indication is affixed to the commodity 60. The benefit-indication detecting section 55 extends the measuring time of the timer 58 and extends the time for detecting a benefit indication (ACT 6).

For example, the informing section 56 sounds the buzzer 25 and causes the store clerk display 24 to display a message such as "Please scan the discount label" (see FIG. 6) to inform that the benefit indication is affixed to the commodity 60 (ACT 7). The code reading apparatus 2 determines whether the benefit indication is detected (ACT 8).

On the other hand, if the trigger label T is not detected (No in ACT 5), the benefit determining section 54 determines that a benefit indication is not affixed to the commodity 60. Therefore, although the measuring time of the timer 58 is not extended, the detection of a benefit indication is performed until the timer 58 times out. In other words, if the trigger label T is not detected (No in ACT 5), the code reading apparatus 2 determines whether a benefit indication is detected (ACT 8).

If a benefit indication is detected (Yes in ACT 8), the information output section 57 outputs code information read by decoding the barcode 62 and benefit information read by the OCR or the like from the benefit indication to the POS terminal 3 (ACT 9).

If a benefit indication is not detected (No in ACT 8), the code reading apparatus 2 determines whether the timer 58 times out (ACT 10). If the timer 58 times out (Yes in ACT 10), the informing section 56 sounds the buzzer 25 and causes the store clerk display 24 to display an error message such as "The discount label is affixed?" (see FIG. 7A) to inform the operator again that a benefit indication is not affixed (ACT 11).

If the operator confirms that a benefit indication is not affixed to the commodity 60 and presses the enter key of the keyboard 22 (Yes in ACT 12), the information output section 57 outputs only the code information to the POS terminal 3 (ACT 14).

On the other hand, if the timer 58 does not time out in ACT 10 (No in ACT 10) and if the enter key is not pressed in ACT 12 (No in ACT 12), the image capturing section 51 captures the image picked up by the camera 20 (ACT 13) and the code reading apparatus 2 shifts to ACT 8.

After ACT 9 or ACT 14, the code reading apparatus 2 determines whether the POS terminal 3 ends sales registration processing and instructs the code reading apparatus 2 to end barcode reading processing (ACT 15). If the end of the barcode reading processing is not instructed (No in ACT 15), the code reading apparatus 2 returns to ACT 2 and continues the processing in ACT 2 and subsequent acts. If the end of the barcode reading processing is instructed (Yes in ACT 15), the code reading apparatus 2 outputs an image pickup OFF signal to the camera controller 49 (ACT 16) and ends the image pickup by the camera 20.

As explained above, according to the first embodiment, if the trigger label T is detected, the informing section 56 informs that the benefit indication is affixed to the commodity 60. Therefore, it is possible to prevent the operator from performing sales registration of the commodity without noticing the benefit indication.

According to the first embodiment, if the trigger label T is detected, the detection time for a benefit indication is extended. Therefore, even if the discount label L is affixed to a position apart from the barcode 62 and images of both the discount label L and the barcode 62 cannot be picked up in one shot, since time for performing scanning plural times is provided, it is possible to surely read the discount label L.

Second Embodiment

Examples of main commodities subjected to a discount include perishables processed and sold in a store. In general, as a commodity code affixed to a commodity processed and sold in a store, an in-store code starting with a specific numerical value (in this embodiment, 2) is used. Referring to FIG. 3, a commodity code is a code "2101234567890" starting with "2". It is seen that an in-store code is affixed to the commodity 60.

In the first embodiment, the detection of the trigger label T and a benefit indication is performed for all commodities. However, for example, in a store that performs discount sales for only commodities affixed with in-store codes, the detection of the trigger label T and a benefit indication only has to be detected for only the commodities affixed with the in-store codes. Therefore, a code reading apparatus 202 according to a second embodiment determines whether a read commodity code is an in-store code and, if the read commodity code is not an in-store code, outputs only code information read from a barcode to the POS terminal 3.

Figure 9:
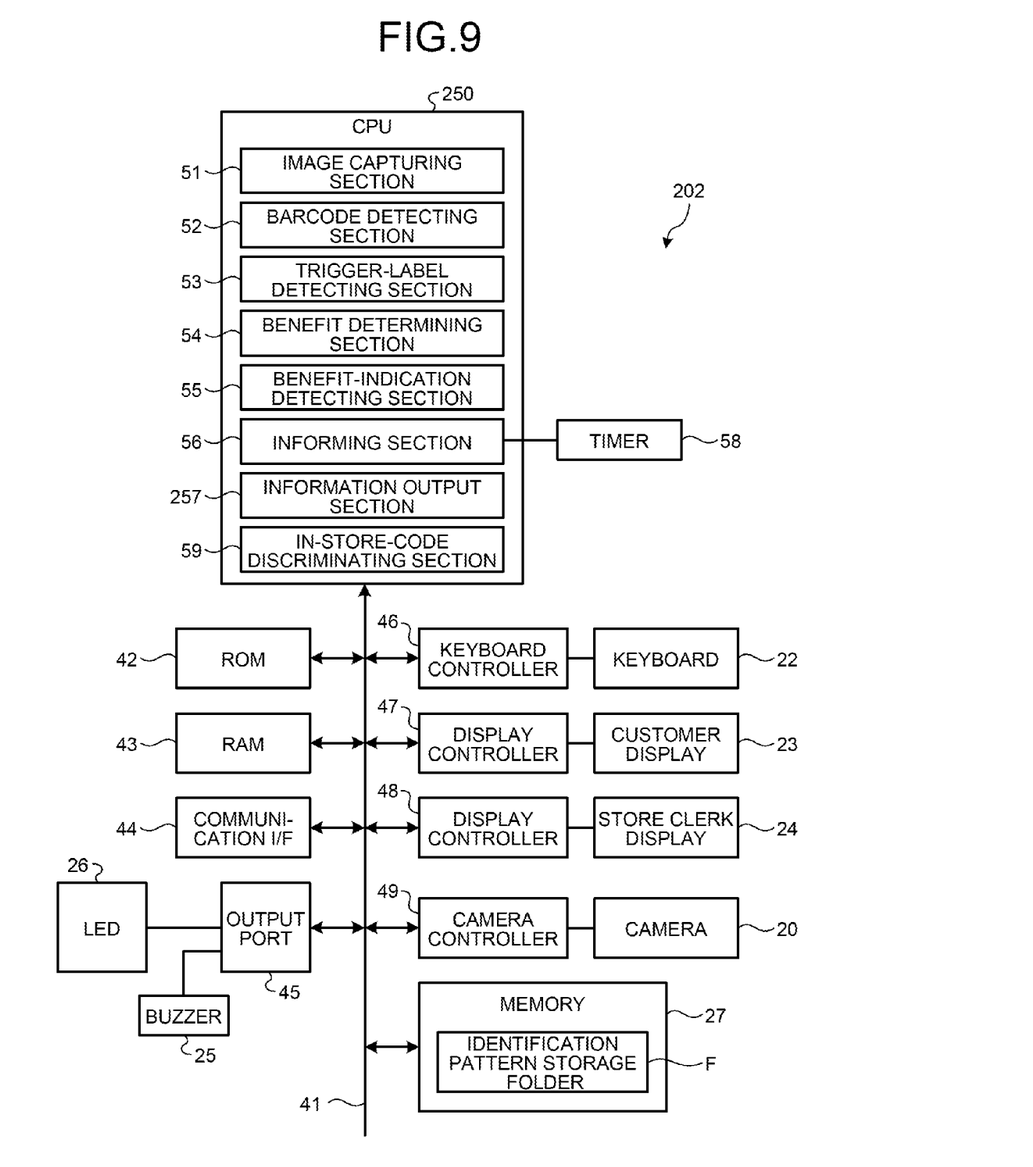
FIG. 9 is a block diagram of the configuration of a code reading apparatus according to a second embodiment.

FIG. 9 is a block diagram of the configuration of the code reading apparatus 202 according to the second embodiment. A CPU 250 of the code reading apparatus 202 further includes an in-store-code discriminating section 59 in addition to the sections of the code reading apparatus 2 according to the first embodiment and includes an information output section 257 different from the information output section 57 according to the first embodiment. Components same as those of the code reading apparatus 2 according to the first embodiment are denoted by the same reference numerals and signs and explanation of the components is omitted.

The in-store-code discriminating section 59 discriminates, referring to code information read by the barcode detecting section 52, whether a commodity code included in the code information starts with a specific numerical value indicating that the commodity code is an in-store code (benefit target information). For example, if the specific numerical value is set as "2" and the commodity code starts with "2" like "2101234567890", the in-store-code discriminating section 59 discriminates that the read code information is an in-store code.

Only if the in-store-code discriminating section 59 discriminates that the code information read by the barcode detecting section 52 is an in-store code, the information output section 257 performs processing for detecting the trigger label T and a benefit indication. If the in-store-code discriminating section 59 discriminates that the code information read by the barcode detecting section 52 is not an in-store code, the information output section 257 does not perform detection of the trigger label T and does not perform a wait for detection of a benefit information and immediately outputs only the code information stored in the RAM 43 to the POS terminal 3.

Figure 10:
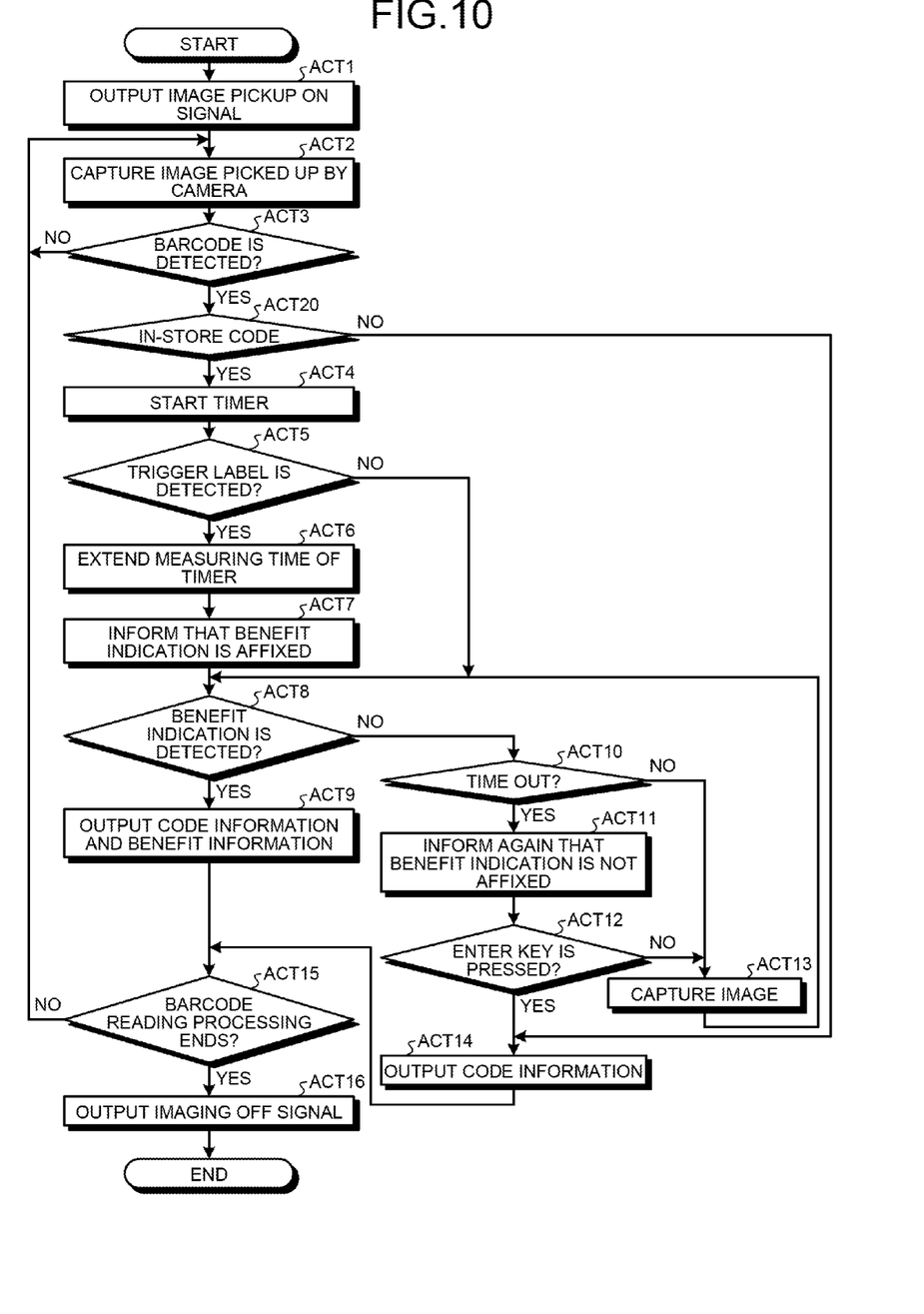
FIG. 10 is a flowchart for explaining a procedure of information reading processing executed by the code reading apparatus.

Information reading processing executed by the code reading apparatus 202 is explained with reference to FIG. 10. FIG. 10 is a flowchart for explaining a procedure of the information reading processing executed by the code reading apparatus 202. Acts same as those shown in FIG. 8 are denoted by the same reference numerals and explanation of the acts is omitted.

The in-store-code discriminating section 59 discriminates whether the barcode 62 read in Act 3 is an in-store code (ACT 20). If the in-store-code discriminating section 59 discriminates that the barcode 62 is an in-store code (Yes in Act 20), the code reading apparatus 202 shifts to Act 4 and performs the processing in Act 4 and subsequent acts. On the other hand, if the in-store-code discriminating section 59 discriminates that the barcode 62 is not an in-store code (No in Act 20), the information output section 257 transmits and outputs the code information read by the barcode detecting section 52 in Act 3 to the POS terminal 3 via the communication I/F 44 (Act 14).

As explained above, according to the second embodiment, the code reading apparatus 202 discriminates from the read barcode 62 whether it is likely that a discount is performed. Therefore, the code reading apparatus 202 performs detection of the trigger label T and a wait for detection of a benefit indication only for commodities that are likely to be discounted. Therefore, since a waiting time for reading of a benefit indication does not have to be provided for all commodities, it is possible to finish sales registration processing for the commodities in a shorter time.

As explained above, according to the first and second embodiments, if the trigger label T is detected, it is determined that a benefit indication is affixed to the commodity 60. Therefore, it is possible to prevent omission of reading of the benefit indication and surely perform a discount.

The example in which one benefit indication is affixed to the commodity 60 is explained above. However, plural benefit indications may be affixed to the commodity 60. In this case, the information output section 57 or 257 outputs, together with code information, plural kinds of benefit information read from the benefit indications to the POS terminal 3.

The benefit information such as a price-cut and a discount and the barcode 62 are not limited to be printed on a label. As another example, the benefit information and the barcode 62 may be directly written or printed on the commodity 60.

Figure 11:
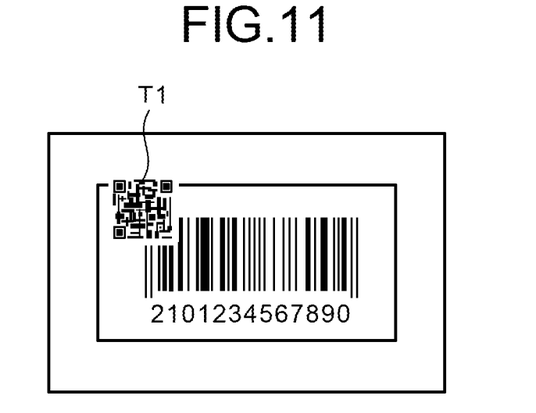
FIG. 11 is a diagram of another example of a trigger label.
Figure 12:
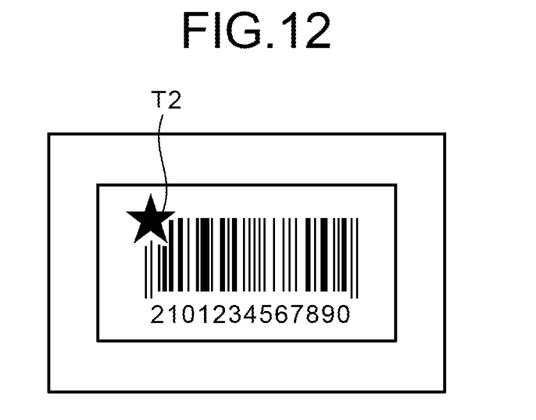
FIG. 12 is a diagram of still another example of the trigger label.

In the above explanation, the trigger label includes, for example, a circle or a circumference, a triangle, or a square having an aspect ratio different from that of the bars of the barcode 62. However, the trigger label may include other figures. FIGS. 11 and 12 are diagrams of other examples of the trigger label. As shown in FIG. 11, a figure of a two-dimensional code may be included in a trigger label T1. As shown in FIG. 12, a figure of a star shape may be included in a trigger label T2.

If a surface of the commodity 60 (see FIG. 3) to which the label 61 is affixed is opposed and parallel to a surface on which the reading window 21 (see FIG. 1) is provided, a front view of the barcode 62 is included in an image captured by the image capturing section 51 as shown in FIG. 4. In this case, an edge shape extracted concerning the trigger label T is a quadruple concentric circle as shown in FIG. 5.

Figure 13:
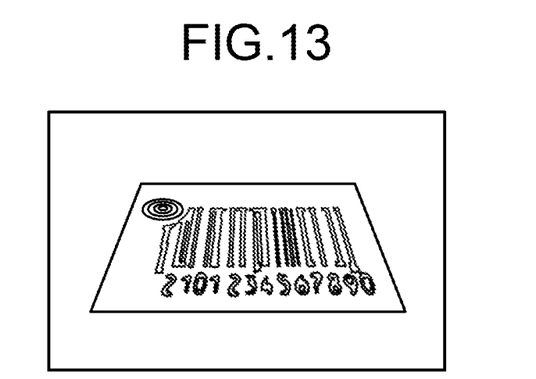
FIG. 13 is a diagram of another example of an image of a trigger label subjected to edge extraction.

On the other hand, if the surface of the commodity 60 to which the label 61 is affixed is not parallel to the surface on which the reading window 21 is provided, an image picked up in a state in which the barcode 62 and the trigger label T tilt is included in an image captured by the image capturing section 51. In this case, an edge shape extracted concerning the trigger label T is not a concentric shape as shown in FIG. 13 in some cases.

Therefore, in the identification pattern storage folder F, as an identification pattern corresponding to the trigger label T of the double circuit shown in FIG. 4, a parameter or the like for enabling identification of the trigger label T even if an image of the trigger label T is picked up in a state in which the trigger label T tilt may be stored. The trigger-label detecting section 53 identifies and detects the trigger label T by performing an image analysis on the basis of this parameter.

In this way, the edge shape of the trigger label T is not limited to a concentric shape. Specifically, if, in an area surrounded by a line, both ends of which coincide with each other, another line, both ends of which coincide with each other, is included as shown in FIGS. 5 and 13, the trigger-label detecting section 53 detects an image corresponding to an edge shape of the lines as the trigger label T.

As a preferred example, it is desirable that the lines, both the ends of which coincide with each other, are quadruple or more lines. This makes it possible to easily distinguish the trigger label T from other shapes.

In the above explanation, if the trigger-label detecting section 53 detects the trigger label T, the benefit-indication detecting section 55 extends the time for detecting a benefit indication. However, the embodiments are not limited to this. As another example, the benefit-indication detecting section 55 may reduce the measuring time of the timer 58 and reduce the time for detecting a benefit indication if the trigger-label detecting section 53 does not detect the trigger label T.

In the above explanation, for example, the informing section 56 sounds the buzzer 25 and causes the store clerk display 24 to display a message to inform that a benefit indication is affixed to a commodity. However, the embodiments are not limited to this. As another example, the informing section 56 may output a message such as "Please scan the discount label." as sound using a not-shown speaker to thereby inform that a benefit indication is affixed to a commodity.

The computer program executed in the code reading apparatuses 2 and 202 according to the embodiments is provided while being incorporated in a ROM or the like in advance. The computer program executed in the code reading apparatuses 2 and 202 according to the embodiments may be configured to be provided as a computer program product while being recorded in a computer-readable recording medium such as a CD-ROM, a flexible disk (FD), a CD-R, or a DVD (Digital Versatile Disk) as a file of an installable format or an executable format.

Further, the computer program executed in the code reading apparatuses 2 and 202 according to the embodiments may be configured to be stored on a computer connected to a network such as the Internet and provided by being downloaded through the network. The computer program executed in the code reading apparatuses 2 and 202 according to the embodiments may be configured to be provided or distributed through the network such as the Internet.

The computer program executed in the code reading apparatuses 2 and 202 according to the embodiments has a module configuration including the sections explained above (the image capturing section 51, the barcode detecting section 52, the trigger-label detecting section 53, the benefit determining section 54, the benefit-indication detecting section 55, the informing section 56, the information output sections 57 and 257, and the in-store-code discriminating section 59). As actual hardware, a CPU (a processor) reads out the computer program from the ROM and executes the computer program, whereby the sections are loaded onto a main storage and the image capturing section 51, the barcode detecting section 52, the trigger-label detecting section 53, the benefit determining section 54, the benefit-indication detecting section 55, the informing section 56, the information output sections 57 and 257, and the in-store-code discriminating section 59 are generated on the main storage.

Further effects and modifications can be easily derived by those skilled in the art. Therefore, a wider aspect of the present invention is not limited by the specific details and the representative embodiments represented and described above. Therefore, various modifications are possible without departing from the spirit and the scope of the general concept of the invention defined by the appended claims and equivalents of the claims.

What is claimed is:

1. A code reading apparatus comprising:
an image capturing section configured to capture an image picked up by an image pickup section;
a first detecting section configured to detect a first symbol including commodity information of a commodity from the image captured by the image capturing section;
a second detecting section configured to detect a second symbol different from a shape of an element included in the first symbol in the image captured by the image capturing section; and
an informing section configured to inform, if the second detecting section detects the second symbol, that a benefit indication indicating a benefit granted with respect to the commodity information is affixed to the commodity.

2. The apparatus according to claim 1, wherein
the first detecting section detects a code symbol as the first symbol, and
the second detecting section detects, as the second symbol, a label indicating that the benefit indication is affixed to the commodity.

3. The apparatus according to claim 1, further comprising a benefit-indication detecting section configured to detect the benefit indication for a predetermined time from the image captured by the image capturing section, wherein
if the second detecting section detects the second symbol, the benefit-indication detecting section extends time for detecting the benefit indication.

4. The apparatus according to claim 1, further comprising a benefit-indication detecting section configured to detect the benefit indication for a predetermined time from the image captured by the image capturing section, wherein
if the second detecting section does not detect the second symbol, the benefit-indication detecting section reduces time for detecting the benefit indication.

5. The apparatus according to claim 1, wherein the second detecting section applies edge extraction to the image and detects the second symbol on the basis of an extracted edge shape.

6. The apparatus according to claim 5, wherein, if the edge shape includes, in an area surrounded by a line, both ends of which coincide with each other, another line, both ends of which coincide with each other, the second detecting section detects an image corresponding to the edge shape as the second symbol.

7. The apparatus according to claim 6, wherein, if the edge shape includes quadruple or more of the lines, both the ends of which coincide with each other, the second detecting section detects an image corresponding to the edge shape as the second symbol.

8. The apparatus according to claim 1, wherein the second symbol is different from the benefit indication.

9. A code reading apparatus comprising:
an image capturing section configured to capture an image picked up by an image pickup section;
a first detecting section configured to detect a first symbol including commodity information of a commodity from the image captured by the image capturing section;
a second detecting section configured to detect a second symbol different from a shape of an element included in the first symbol in the image captured by the image capturing section; and a benefit-indication detecting section configured to detect, from the image captured by the image capturing section, for a predetermined time, a benefit indication indicating a benefit granted with respect to the commodity information, wherein if the second detecting section detects the second symbol, the benefit-indication detecting section sets time for detecting the benefit indication longer than time for detecting the benefit information if the second detecting section does not detect the second symbol.

10. The apparatus according to claim 9, wherein the first detecting section detects a code symbol as the first symbol, and the second detecting section detects, as the second symbol, a label indicating that the benefit indication is affixed to the commodity.

11. The apparatus according to claim 9, wherein the second detecting section applies edge extraction to the image and detects the second symbol on the basis of an extracted edge shape.

12. The apparatus according to claim 11, wherein, if the edge shape includes, in an area surrounded by a line, both ends of which coincide with each other, another line, both ends of which coincide with each other, the second detecting section detects an image corresponding to the edge shape as the second symbol.

13. The apparatus according to claim 12, wherein, if the edge shape includes quadruple or more of the lines, both the ends of which coincide with each other, the second detecting section detects an image corresponding to the edge shape as the second symbol.

14. A code reading method performed in a code reading apparatus comprising:

capturing an image picked up by an image pickup section;

detecting a first symbol including commodity information of a commodity from the captured image;

detecting a second symbol different from a shape of an element included in the first symbol in the captured image; and informing, if the second symbol is detected, that a benefit indication indicating a benefit granted with respect to the commodity information is affixed to the commodity.

15. The apparatus according to claim 14, wherein the second symbol is different from the benefit indication.

16. A code reading method performed in a code reading apparatus comprising:

capturing an image picked up by an image pickup section;

detecting a first symbol including commodity information of a commodity from the captured image;

detecting a second symbol different from a shape of an element included in the first symbol in the captured image; and detecting, from the captured image, for a predetermined time, a benefit indication indicating a benefit granted with respect to the commodity information, wherein in the detecting of a benefit indication, if the second symbol is detected, time for detecting the benefit indication is set longer than time for detecting the benefit information if the second symbol is not detected.

\* \* \* \* \*